Aug. 21, 1962
W. W. RAYDER
3,050,137
PLOW STRUCTURE
Filed July 6, 1959
2 Sheets—Sheet 1
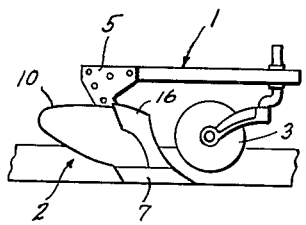
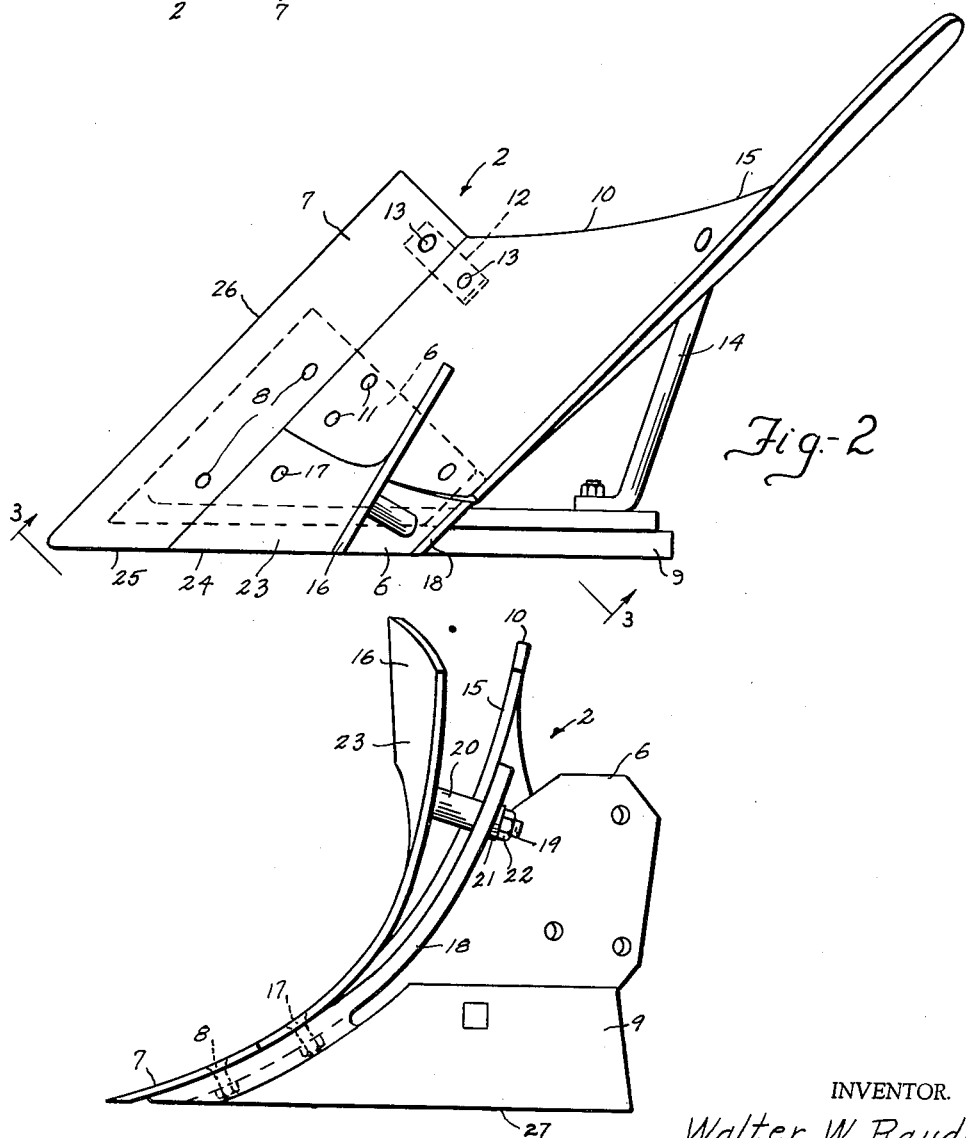
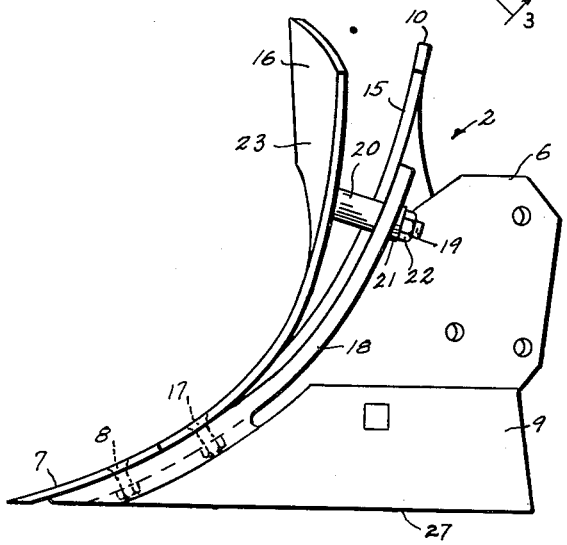
INVENTOR.
Walter W. Rayder
BY Charles S. Penfold
ATTORNEY Aug. 21, 1962 — W. W. RAYDER — 3,050,137
PLOW STRUCTURE
Filed July 6, 1959 — 2 Sheets-Sheet 2

INVENTOR.
Walter W. Rayder
BY Charles S. Penfold
ATTORNEY

3,050,137
PLOW STRUCTURE
Walter W. Rayder, Valparaiso, Ind., assignor, by mesne assignments, to Brice H. Lantz, Valparaiso, Ind.
Filed July 6, 1959, Ser. No. 824,992
8 Claims. (Cl. 172—759)

The subject invention relates generally to farm equipment and more particularly is directed to improvements in plows.

The principal object of the invention is to provide a plow having a primary moldboard and with what may be termed a shin or secondary moldboard which serves to displace and turn over soil into a position whereby it is subsequently covered by soil turned thereover by the primary moldboard.

More specifically in this regard, the plow embodying the invention comprises, among other things, elongated body or wall structure which is provided with a relatively large curved blade or portion at its rear extremity which, in combination with the body structure, constitutes the primary moldboard and further provided with a relatively small curved blade or portion disposed in advance of the large blade, which in combination with the body structure constitutes the secondary moldboard or shin. Otherwise expressed, the blade portions are arranged at the same side of the body structure at longitudinally spaced locations and/or adjacent the extremities of the body structure and so that such structure is common to both blade portions or moldboards.

A significant object of the invention is to provide a plow of the character above described in which the secondary moldboard is also preferably so constructed and arranged that it will pick up a considerable quantity of firm unbroken soil, turn, break up and distribute it over a predetermined area to efficiently cover mulch, fertilizer trash and the like in advance of the soil turned thereover by the primary moldboard. The location of the secondary moldboard also has the advantage that the soil serves to maintain it in a clean state or condition.

An important object of the invention is to provide a plow in which the moldboards are detachably mounted in a stable operative relationship with respect to one another and to related components of the body structure.

Additional objects are to provide a plow in which the components thereof are designed and constructed to reduce costs with respect to manufacture and assembly, and promote durability, stability and efficiency.

Other objects and advantages of the invention will become apparent after the description hereinafter set forth is considered in conjunction with the drawings annexed hereto.

In the drawings:

FIGURE 1 is a side elevational view of a plow embodying the subject invention;

FIGURE 2 is a top view of the plow;

FIGURE 3 is a view of the plow looking in the direction of the arrows 3—3 in FIGURE 2;

Figure 4:
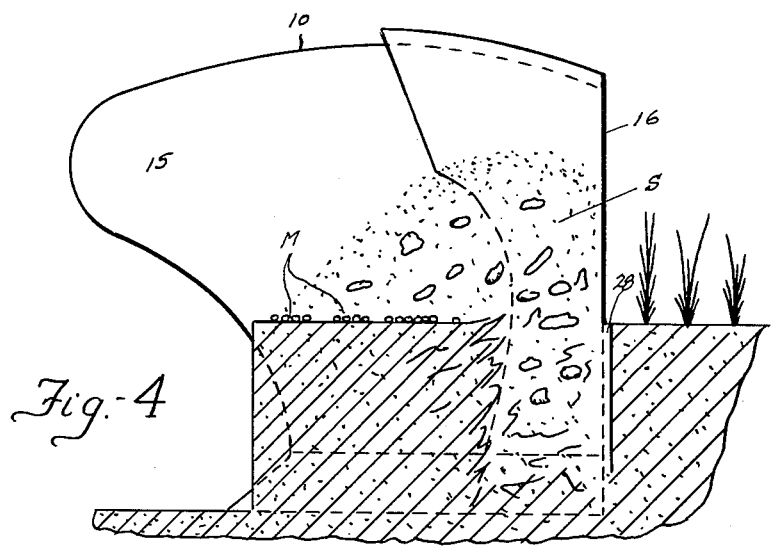
FIGURE 4 is a vertical section taken through soil with the plow in motion.

Referring more particularly to FIGURES 1, 2 and 3 of the drawing, numeral 1 generally designates the beam of a plow structure, 2 a plow mounted on the aft end of the beam and 3 a coulter adjustably carried by the fore end of the beam for parting the soil in advance of the plow.

The plow may be mounted on the beam in any manner desired but as depicted is preferably attached thereto by a hanger 4, the upper end of which is bolted or otherwise secured to a plate 5, which, in turn, is attached to the beam. The lower end of the hanger may be detachably connected to a support, frame or frog member 6 on the inner side of the plow.

A plow share, point or runner 7 is preferably detachably connected to one side of the support 6 by bolts 8 and a landside or plate 9 is connected to another side of the support in an angular relationship to the point 7.

The fore extremity of a primary moldboard 10, which has been alluded to above in the objects, is preferably detachably connected to the support by bolts 11. The lower edge portion of this moldboard is straight and abuts the upper straight edge portion of the share or point 7. The moldboard has a heel portion which is preferably attached to the rear end of the share by a strap 12 detachably connected against the rear surfaces of these components by bolts 13 as depicted in FIGURE 2. The rear extremity of the moldboard above its heel portion is preferably detachably connected to the outer portion of the landside 9 by a brace 14. The moldboard 10 is thus firmly anchored and braced in an operative position. The moldboard includes a curved blade portion 15 which terminates above and to the rear of its heel portion and a straight edge portion which is disposed substantially vertically between the ends of the share. Attention is directed to the fact that the lower portion of the moldboard merges or flares into cooperation with the share or point 7 in order to provide a substantially smooth continuous surface from the bottom edge of the share to the upper edge of the moldboard.

A secondary moldboard 16, somewhat smaller in size than the primary moldboard, is detachably secured at its lower extremity to the support 6 by a bolt 17 and its upper extremity is detachably secured to and in spaced relation to an upturned portion 18 of the support 6. More specifically in this regard, the upper extremity is secured by means of a bolt 19 having a head inset in the extremity and a shank which extends through a tubular spacer 20 interposed between the moldboard and portion 18. The shank also extends through the portion 18 and a boss or washer 21 thereon, and a nut 22 is connected to the threaded end of the shank to firmly brace the moldboard. This moldboard includes a lower extremity which bears against the support and abuts and merges with the upper edge portion of the share 7 and the fore edge portion of the primary moldboard as clearly shown in FIGURES 1, 2 and 3. The secondary moldboard also includes a curved blade portion 23, which is similar in shape to the blade portion of the primary moldboard and has a somewhat greater curvature. It will be noted that the upper extremity of the secondary moldboard is gradually spaced from the primary moldboard as viewed in FIGURE 3 and that its blade portion is disposed in a generally acute angular relationship with respect to the primary moldboard as viewed particularly in FIGURE 2 of the drawing.

It will be noted that the secondary moldboard includes a fore or leading edge portion 24 which constitutes a continuation of a leading edge portion 25 of the share. These edge portions and a bottom edge portion 26 of the share define an acute angle, as viewed in plan, and the same is substantially true of the bottom edge of the share and the plane of the landside 9. The landside has a lower or bottom edge portion 27 which is substantially disposed in the same plane as the bottom edge portion 26 of the share.

Attention is directed to the fact that the vertical height of the secondary moldboard is slightly greater than the vertical height of the primary moldboard but may correspond thereto or be lower. More specifically in this respect, the lower extremities or edge portions of both moldboards abut the share and therefore act on the soil at substantially the same depth. This factor and the relationship of the secondary moldboard to the primary moldboard is of great importance because a considerable quantity of the soil is first lifted or picked up by the secondary moldboard and turned over upon the topsoil to efficiently overlay any ground cover, such as vegetation, mulch, fertilizer, debris, etc. thereon in advance of the primary moldboard which lifts and turns over a much larger quantity of soil onto that turned over and distributed by the secondary moldboard. With this unique setup all or practically all of any material overlaying the surface of the soil, before plowing which is to be turned under, is substantially or completely covered by the soil turned over by the secondary moldboard but in order to fully or doubly insure complete coverage of this soil and material the primary moldboard follows through and turns over thereupon a much greater quantity of soil.

Figure 5:
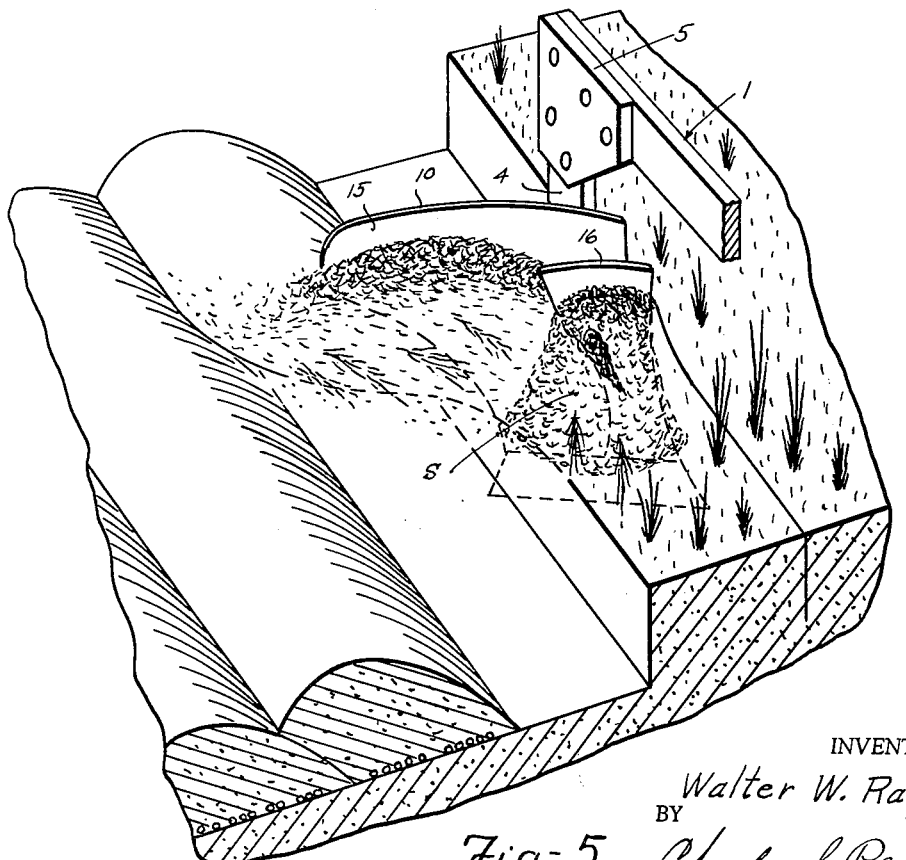
FIGURE 5 is a pictorial view which more clearly illustrates the manner in which the primary and secondary moldboards act or operate on the soil.

As exemplified in FIGURES 4 and 5, the plow structure is shown advancing through the soil in line with a groove or parting 28 made by the coulter, with soil indicated by the letter "S" being upturned by the secondary moldboard and directed forwardly and laterally upon material "M" on the upper surface of the unplowed soil to cover same and as this action occurs the primary moldboard turns over a much larger quantity of soil onto that turned over in advance thereof by the secondary moldboard. After at least one trench is made by the plow, the material "M" will be held in place by soil turned over by the secondary moldboard where it is subsequently covered by the soil through the action of the primary moldboard.

In view of the foregoing, it will be manifest that the structure affords a unique setup whereby the secondary moldboard tucks under or directs soil under the soil being turned over by the primary moldboard. In other words, the material is first turned over and/or covered by the secondary moldboard to anchor it in place so that it will be completely covered by the overlay directed thereupon by the primary moldboard. The moldboards pick up firm soil from substantially the same depth and the carrying over of at least some of the soil by the primary moldboard which has been upturned and/or overturned by the secondary moldboard causes all of the agitated soil to be loosened and intermingle and thereby provide a good bed for the purpose intended.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. A plow comprising body structure having a share, a landside extending along the bottom thereof and provided with a leading edge, a primary moldboard carried by the body structure and having a lower portion merging with the share, and an elongate secondary moldboard carried by the body structure in an upstanding position substantially in front of the primary moldboard and having a lower enlarged extremity merging with the share, said secondary moldboard also having a leading edge disposed substantially in the same plane as the leading edge of said share and further having an enlarged upper extremity extending substantially parallel to said share and a curved edge disposed between said extremities defining an opening through which soil may flow.

2. The plow defined in claim 1, in which the upper extremity and lower extremity of the secondary moldboard are respectively generally rectangular and triangular in shape.

3. The plow defined in claim 1, in which the secondary moldboard is substantially continuously curved throughout its height and its lower extremity is substantially triangular in shape.

4. A plow having a body structure and an elongate share extending along the bottom of one side of the body structure and provided with a leading edge, a large curved blade secured to the body structure and having a lower portion constituting a continuation of the share to provide a primary moldboard, and a small upstanding curved blade mounted adjacent the large blade and having an enlarged lower extremity constituting a continuation of the share to provide a secondary moldboard, said small blade having a leading edge disposed in substantially the same plane as the leading edge of said share and also having an intermediate restricted portion above said lower extremity assisting to control the flow of soil rearwardly therefrom.

5. The plow defined in claim 4, in which the lower extremity of said small blade is substantially triangular in shape.

6. A plow comprising a body structure, a primary moldboard carried by the body structure, a landside carried by said body structure and having an outer planar surface, an elongate secondary moldboard of a size somewhat smaller than the primary moldboard carried by said body structure and arranged in an upstanding position, said secondary moldboard having a first curved leading edge disposed substantially in the same plane as the said planar surface of said landside and a second edge disposed in opposed relation to and curved toward said first edge at a location intermediate the length of the latter to reduce the width of said secondary moldboard and thereby define an opening through which soil may flow, said secondary moldboard further having a lower enlarged extremity for directing soil upwardly therealong.

7. A plow having a body structure, a large curved blade secured to the body structure and constituting a primary moldboard, and a small upstanding curved blade mounted adjacent the large blade and having an enlarged lower extremity secured relative to a lower portion of said primary moldboard for directing soil upwardly, said small blade constituting a secondary moldboard and having a leading edge disposed in line with the normal direction that the plow is adapted to travel and also having an intermediate restricted portion above said lower extremity assisting to control the flow of soil rearwardly therefrom.

8. In a plow having a body structure provided with a large curved blade secured to the body structure and constituting a primary moldboard, the improvement which comprises a small upstanding blade adapted to be mounted adjacent the large blade and having an enlarged lower extremity adapted for securement relative to a lower portion of said primary moldboard for directing soil upwardly, said small blade constituting a secondary moldboard and having a leading edge adapted for disposition in line with the normal direction that the plow is adapted to travel and also having an intermediate restricted portion above said lower extremity assisting to control the flow of soil rearwardly therefrom.

References Cited in the file of this patent

UNITED STATES PATENTS

| | | |
|---|---|---|
| 234,251 | Currier | Nov. 9, 1880 |
| 338,481 | Casaday | Mar. 23, 1886 |
| 680,846 | Downen | Aug. 20, 1901 |
| 981,294 | Livermore | Jan. 10, 1911 |
| 1,686,177 | Rosekelly | Oct. 2, 1928 |
| 2,672,805 | Longenbach | Mar. 23, 1954 |
| 2,712,784 | Bauer | July 12, 1955 |